(12) United States Patent
Prosyk et al.

(10) Patent No.: US 8,903,202 B1
(45) Date of Patent: Dec. 2, 2014

(54) MACH-ZEHNDER OPTICAL MODULATOR HAVING A TRAVELLING WAVE ELECTRODE WITH A DISTRIBUTED GROUND BRIDGING STRUCTURE

(71) Applicant: Teraxion Inc., Quebec (Quebec) (CA)

(72) Inventors: Kelvin Prosyk, Ottawa (CA); Ian Nicholas Woods, Ottawa (CA)

(73) Assignee: Teraxion Inc., Quebec (CA)

( * ) Notice: Subject to any disclaimer, the term of this patent is extended or adjusted under 35 U.S.C. 154(b) by 0 days.

(21) Appl. No.: 14/081,388

(22) Filed: Nov. 15, 2013

Related U.S. Application Data

(60) Provisional application No. 61/724,810, filed on Nov. 9, 2012.

(51) Int. Cl.
*G02F 1/035* (2006.01)
*G02F 1/01* (2006.01)
*G02F 1/21* (2006.01)
*G02F 2/00* (2006.01)

(52) U.S. Cl.
CPC .......... *G02F 1/011* (2013.01); *G02F 2001/212* (2013.01); *G02F 2002/008* (2013.01); *G02F 2203/50* (2013.01)
USPC ...................................... 385/3; 385/2; 385/45

(58) Field of Classification Search
CPC ................... G02F 2001/212; G02F 2002/008; G02F 2203/50; G02F 1/11; G02B 6/2935; H01S 5/062
USPC .............. 385/1, 2, 3, 14, 31, 45, 50
See application file for complete search history.

(56) References Cited

U.S. PATENT DOCUMENTS

| | | | | |
|---|---|---|---|---|
| 6,647,158 B2 * | 11/2003 | Betts et al. | ......................... | 385/2 |
| 7,082,237 B2 * | 7/2006 | Walker et al. | .................... | 385/40 |
| 7,272,271 B2 * | 9/2007 | Kaplan et al. | ..................... | 385/3 |
| 7,321,702 B2 * | 1/2008 | Akiyama et al. | .................. | 385/3 |
| 7,382,943 B1 * | 6/2008 | Heaton | .............. | 385/3 |
| 7,394,950 B2 * | 7/2008 | Sugiyama | ......................... | 385/8 |
| 8,280,201 B2 | 10/2012 | Prosyk | | |
| 8,380,017 B2 * | 2/2013 | Sugiyama | ......................... | 385/3 |
| 2003/0002766 A1 * | 1/2003 | Pruneri et al. | ..................... | 385/2 |
| 2006/0056766 A1 * | 3/2006 | Sugiyama | ....................... | 385/40 |
| 2013/0209023 A1 * | 8/2013 | Prosyk | .............................. | 385/3 |

OTHER PUBLICATIONS

Klein et al., 1.55 μm Mach-Zehnder Modulators on InP for optical 40/80 Gbit/s transmission networks, OFC/NFOEC 2006, paper TuA2 pp. 171-173.
Walker et al., Optimized Gallium Arsenide Modulators for Advanced Modulation Formats, IEEE Journal of Selected Topics in Quantum Electronics, 2013, pp. 1-12.

\* cited by examiner

*Primary Examiner* — Ellen Kim
(74) *Attorney, Agent, or Firm* — Hovey Williams LLP

(57) ABSTRACT

A Mach-Zehnder optical modulator with a travelling wave electrode having one or more signal transmission line conductors and one or more ground transmission line conductors is provided. The modulator includes a ground strip conductor extending substantially in parallel to the ground transmission line conductors, and a distributed bridging structure electrically connecting the ground strip conductor and at least one of the ground transmission line conductors along a substantial portion of a length thereof. The distributed bridging structure may be embodied by a plurality of electrical connections at disposed regularly spaced intervals.

23 Claims, 11 Drawing Sheets

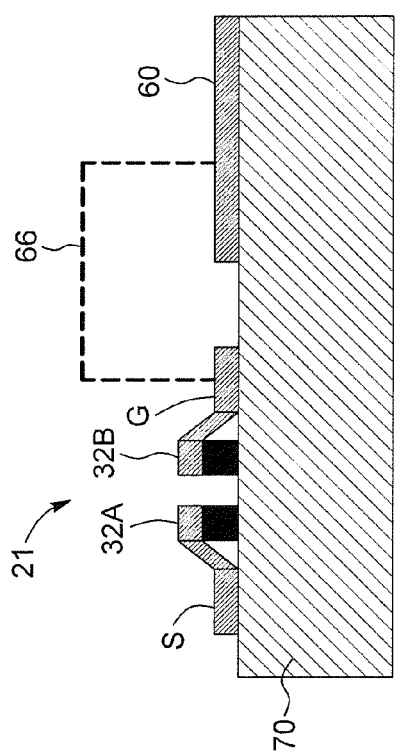
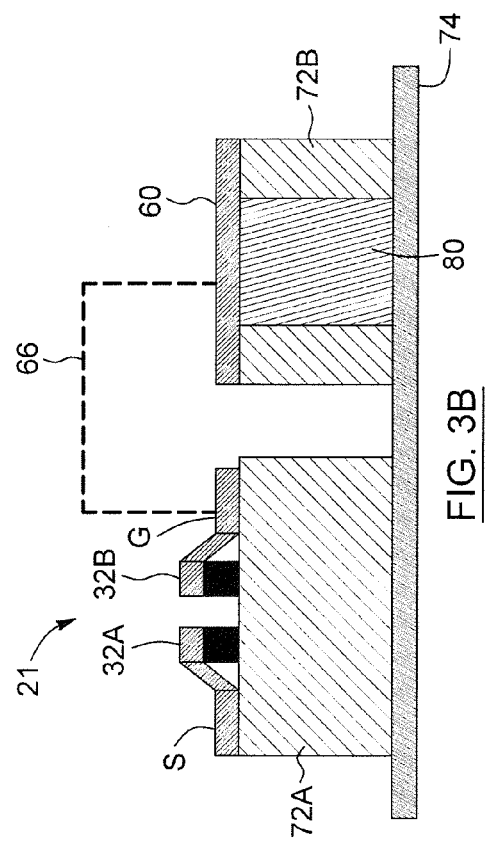

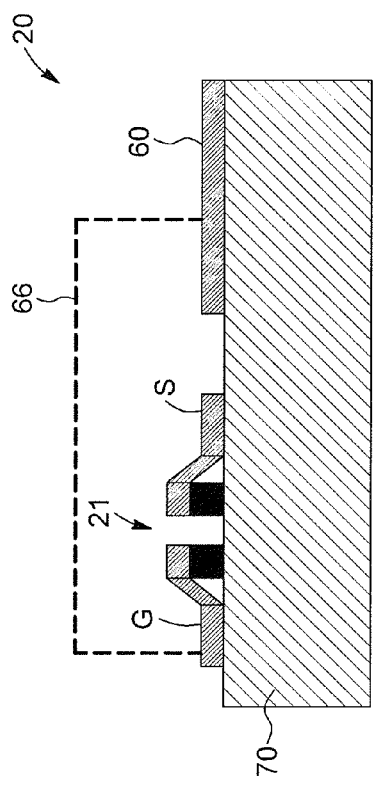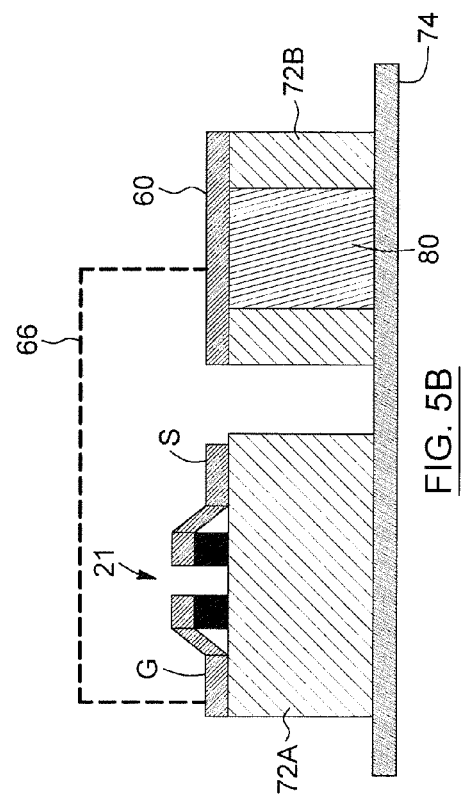
FIG. 5A
FIG. 5B

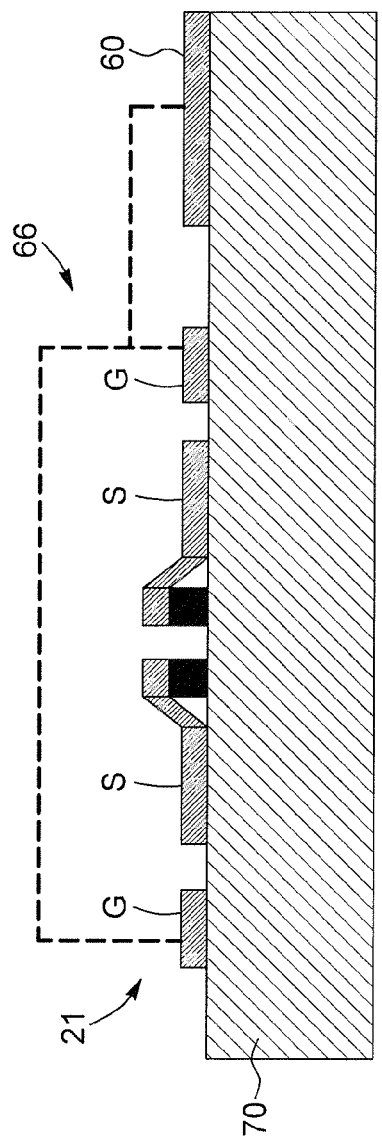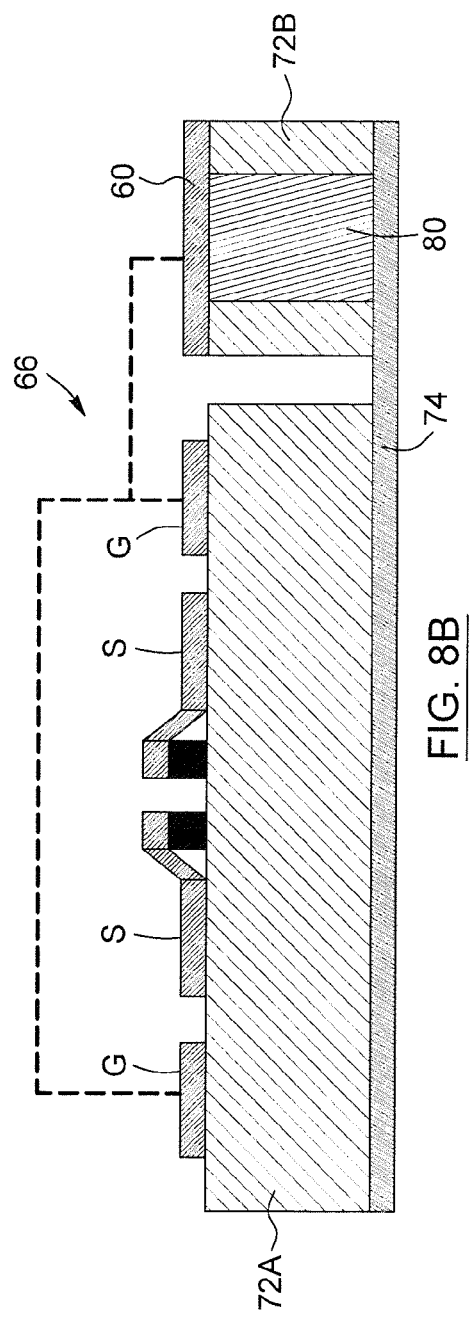

MACH-ZEHNDER OPTICAL MODULATOR HAVING A TRAVELLING WAVE ELECTRODE WITH A DISTRIBUTED GROUND BRIDGING STRUCTURE

RELATED APPLICATION

This application claims priority benefit of a provisional application entitled, "MACH-ZEHNDER OPTICAL MODULATOR HAVING A TRAVELLING WAVE ELECTRODE WITH A DISTRIBUTED GROUND BRIDGING STRUCTURE," Ser. No. 61/724,810, filed Nov. 9, 2012 and incorporated by reference herein in its entirety.

FIELD OF THE INVENTION

The present invention relates generally to the field of optical modulators. More specifically, the present invention discloses a Mach-Zehnder optical modulator having a travelling wave electrode connected to a ground strip conductor by a distributed bridging structure.

BACKGROUND

Optical modulators have been employed for many years in the field of optical communications to accept modulated data in electrical format (typically radio frequency or RF) and transfer the data onto an optical carrier. In a Mach-Zehnder optical modulator 20, the main components of which being generally shown in FIG. 1A (PRIOR ART), a beamsplitter 22 divides the laser light from an input optical waveguide 24 into two optical beams propagating in parallel waveguides defining optical paths 28A and 28B, at least one of which having a phase modulator in which the refractive index is a function of the strength of the locally applied electric field. In the example of FIG. 1A light in both optical paths 28A, 28B undergoes a phase modulation, although in other configurations the refractive index in only one of the optical paths could be modulated with respect to the other. The beams are then recombined by an output optical combiner 26. Changing the electric field on the phase modulating paths determines whether the two beams interfere constructively or destructively when recombined, and thereby controls the amplitude or intensity of the exiting light. In some configurations, the phase of the exiting light can be controlled via a variety of means such as by manipulating the phase modulation signal, or through design.

In the configuration shown in FIG. 1A, the modulating electric field is provided by a segmented travelling wave electrode 21 (or TWE) that consists of two or more transmission line conductors 30A, 30B oriented substantially parallel to the optical paths 28A, 28B, and a plurality of pairs of waveguide electrodes 32A, 32B. At least one of the transmission line conductors 30A and 30B carries the RF signal, while the other may either also carry the RF signal or be connected to ground. Each waveguide electrode 32A, 32B is connected one of the transmission line conductors 30A, 30B via a corresponding tap or bridge conductor 34A, and 34B. Each bridge conductor 34A, 34B branches out of one of the transmission line conductors 30A, 30B in a direction substantially perpendicular to the optical path 28A, 28B. The transmission line conductors 30A, 30B convey an RF signal along an RF path that is substantially parallel to the optical paths 28A, 28B.

The configuration shown in FIG. 1A is known as a Mach-Zehnder modulator operated in "push-pull" mode is referred to as a series push-pull travelling wave electrode, after Klein et al., "1.55 μm Mach-Zehnder Modulators on InP for optical 40/80 Gbit/s transmission networks", OFC/NFOEC 2006, paper TuA2, and described in further detail by R. G. Walker, "High-Speed III-V Semiconductor Intensity Modulators", IEEE J. Quant. Elect., vol. 27(3), pp. 654-667, 1991. In a series push-pull configuration, a single voltage signal or field is used to phase modulate the interfering signals in the two arms in anti-phase. Each pair of waveguide electrodes 32A, 32B, as shown in FIG. 1A, impart a phase change to the optical wave in the waveguide 28A, 28B and also act as a pair of capacitors in series and as a load on the main transmission line conductors 30A, 30B.

A travelling wave electrode Mach-Zehnder optical modulator can be driven using a single RF signal input, as illustrated in FIG. 1B (PRIOR ART). In the illustrated example, the travelling wave electrode 21 of the modulator 20 includes a first transmission line conductor conveying the input electrical signal, therefore acting as a signal transmission line conductor (S), and a second transmission line conductor connected to a ground reference, therefore acting as a ground transmission line conductor (G). This modulator configuration is single-end as it includes a single signal transmission line and is sometimes referred to as an SG modulator (also known as coplanar strip). In the specific embodiment shown in FIG. 1B, the electrical modulation signal is provided by an RF voltage source 50 having a single signal line 52 and a ground line 54, both embodied by a RF waveguide such as a coaxial cable. The signal line 52 of the driver 50 is connected to the signal transmission line conductor S of the travelling-wave electrode 21, whereas the ground line 54 of the driver 50 is connected to the ground transmission line conductor G of the travelling-wave electrode 21. A nominal terminal load 56 (e.g., 50 ohms) joins the distal ends of the S and G transmission lines. The modulation voltage across the arms of the travelling wave electrode is the difference between the signal voltage and ground.

It should be noted that other types of RF drives are known in the optical telecommunications industry, requiring other arrangements of transmission line conductors in the modulator. For example, the prior art includes optical modulators with differential-drive GSGSG and GSSG formats.

It is a well-known objective of electronics and photonics to reduce size. In integrated electronics and photonics, size usually refers to the footprint in the XY plane, i.e., the area occupied by a device at or near the surface of a semiconductor wafer. Integrated Mach-Zehnder optical modulators are typically much longer than they are wide (i.e., larger in the X direction than they are in the Y direction, according to the convention shown in FIGS. 1A and 1B). For example, high bandwidth modulators commonly used for digital optical fiber communications, made of indium phosphide or lithium niobate, can be ten times longer than they are wide, in large part due to the length of interaction required between the electrical and optical signals for optimal performance. As a result of this extreme aspect ratio, much attention is focused on reducing the length of such devices. However, an increase in the number of devices per chip or per wafer can also be achieved by: (1) reducing the spatial separation between side-by-side neighboring devices in the Y direction; and (2) reducing the width of the individual device itself.

In the prior art modulator design shown in FIG. 1B, compacting the space between devices has serious drawbacks. Although one of the transmission line conductors is grounded in this design, the other carries the signal, and is sometimes known as the "hot" or "live" conductor. At high frequencies in particular, the capacitance and inductance of this signal transmission line conductor is sensitive to the surrounding environment, i.e., to the characteristics and geometry of dielectrics and other conductors nearby. If other devices are placed close to it on the same chip, the performance of the device can be largely impaired. Furthermore, the presence of conductors in neighboring devices can cause them to be electromagnetically coupled to the signal conductor of the Mach-Zehnder modulator, and a disadvantageous phenomenon known as cross-talk can occur. Even if the Mach-Zehnder modulator is the only device on a chip, the presence of a cleaved edge of the chip too close to the signal conductor can be problematic, such as would be the case if the modulators are tightly packed on a wafer before dicing.

A GSSG configuration offers some improvement with regard to electrical isolation from the external environment. Since the outer two transmission line conductors are electrically connected to ground with the pair of signal transmission line conductors nested between them, this type of Mach-Zehnder modulator can be placed very close, in the Y direction, to another device and yet not electromagnetically couple to it. However, the improvement in electromagnetic isolation comes at the cost of a wider device, since four transmission line conductors are required, versus only two for the device shown in FIG. 1B.

Both these designs have drawbacks with regard to reducing device width. Both designs rely on at least one transmission line conductor that has a good path to ground. For good performance, this conductor should be very wide, so that current returning from the signal transmission line conductor encounters little inductance. Making the ground transmission line conductor too narrow can cause unintentional and disadvantageous degradation to the fidelity of the signal. Obviously, the desire for a narrow modulator is at odds with the need for a wide transmission line conductor for ground.

There remains a need, therefore, to provide designs for a travelling wave electrode Mach-Zehnder modulator that can be made narrow and placed in close proximity to other devices on the same chip. Preferably, such designs should avoid or minimize degradation of the performance of the modulator caused by: (1) interaction between the signal conductor(s) and the environment; (2) interaction between the signal conductor(s) and neighboring devices; or (3) a grounded transmission line conductor that is too narrow to provide a sufficient current-return path.

SUMMARY

In accordance with one aspect of the invention, there is provided a Mach-Zehnder optical modulator for modulating an input optical beam according to an electrical modulation signal. The Mach-Zehnder modulator includes an optical structure dividing the input optical beam into two optical beam components propagating in two optical waveguides branches, respectively, and recombining the optical beam components downstream the optical waveguides branches.

The Mach-Zehnder modulator further includes a travelling wave electrode modulating a relative phase of the optical beam components. The travelling wave electrode includes a signal transmission line conductor coupled to one of the optical waveguide branches and conveying the input electrical signal, and a ground transmission line conductor providing a return path for the input electrical signal.

The Mach-Zehnder modulator also includes a ground strip conductor extending substantially in parallel to the ground transmission line conductor, and a distributed bridging structure electrically connecting the ground strip conductor and the ground transmission line conductor along a substantial portion of a length thereof.

In accordance with another aspect of the invention, there is also provided a Mach-Zehnder optical modulator for modulating an input optical beam according to an electrical modulation signal. The Mach-Zehnder modulator includes an optical structure dividing the input optical beam into two optical beam components propagating in two optical waveguides branches, respectively, and recombining the optical beam components downstream the optical waveguides branches.

The Mach-Zehnder modulator further includes a travelling wave electrode modulating a relative phase of the optical beam components. The travelling wave electrode has a pair of signal transmission line conductors each coupled to a respective one of the optical waveguide branches and conveying the input electrical signal, and a pair of ground transmission line conductors each providing a return path for the input electrical signal. The pair of signal of transmission line conductors is positioned between the ground transmission line conductors.

The Mach-Zehnder modulator also includes a ground strip conductor extending substantially in parallel to the ground transmission line conductors, and a distributed bridging structure electrically connecting the ground strip conductor and at least one of the ground transmission line conductors along a substantial portion of a length thereof.

These and other advantages, features, and objects of the present invention will be more readily understood in view of the following detailed description and the drawings.

BRIEF DESCRIPTION OF THE DRAWINGS

FIGS. 3A and 3B are simplified schematic end views of Mach-Zehnder optical modulators according to variants of the embodiment of FIG. 2, where the ground strip conductor extends on a same substrate (FIG. 3A) and on a different substrate (FIG. 3B) than the travelling-wave electrode.

FIGS. 5A and 5B are simplified schematic end views of Mach-Zehnder optical modulators according to variants of the embodiment of FIG. 4, where the ground strip conductor extends on a same substrate (FIG. 5A) and on a different substrate (FIG. 5B) than the travelling-wave electrode.

FIGS. 8A and 8B are simplified schematic end views of Mach-Zehnder optical modulators according to variants of the embodiment of FIG. 7, where the ground strip conductor extends on a same substrate (FIG. 8A) and on a different substrate (FIG. 8B) than the travelling-wave electrode.

DETAILED DESCRIPTION OF EMBODIMENTS

Embodiments of the invention relate to Mach-Zehnder optical modulators. As one skilled in the art will readily understand, a Mach-Zehnder modulator is a device which induces a phase shift between two components of an input optical light beam in order to modulate the optical properties of the input light beam in accordance with interferometric principles. It will be readily understood that Mach-Zehnder modulators may have a variety of configurations and that the particular configurations described herein are provided by way of example only.

The input optical beam to be modulated may have any optical characteristic appropriate for the application to which is destined the optical modulator. Optical modulators are used for in a variety of contexts, for example modulating light from a continuous wave (CW) laser source with no prior modulation encoded upon it, or further modulate in phase and/or amplitude an optical signal formed from a series of regular pulses at intervals determined by the data rate. Since the optical signal "returns to zero" at the end of every unit interval, the format is often referred to as "RZ". In another example, an optical modulator may be used to impose a modulation on a series of pulses as above, except that consecutive pulses are 180 degrees out of phase at the optical carrier frequency. In the Fourier spectrum, this has the effect of suppressing the optical carrier component, and is sometimes referred to as a "carrier suppressed return-to-zero" or CS-RZ modulation format. Of course, it will be readily understood that the above examples are given for illustrative purposes only.

Figure 1A:
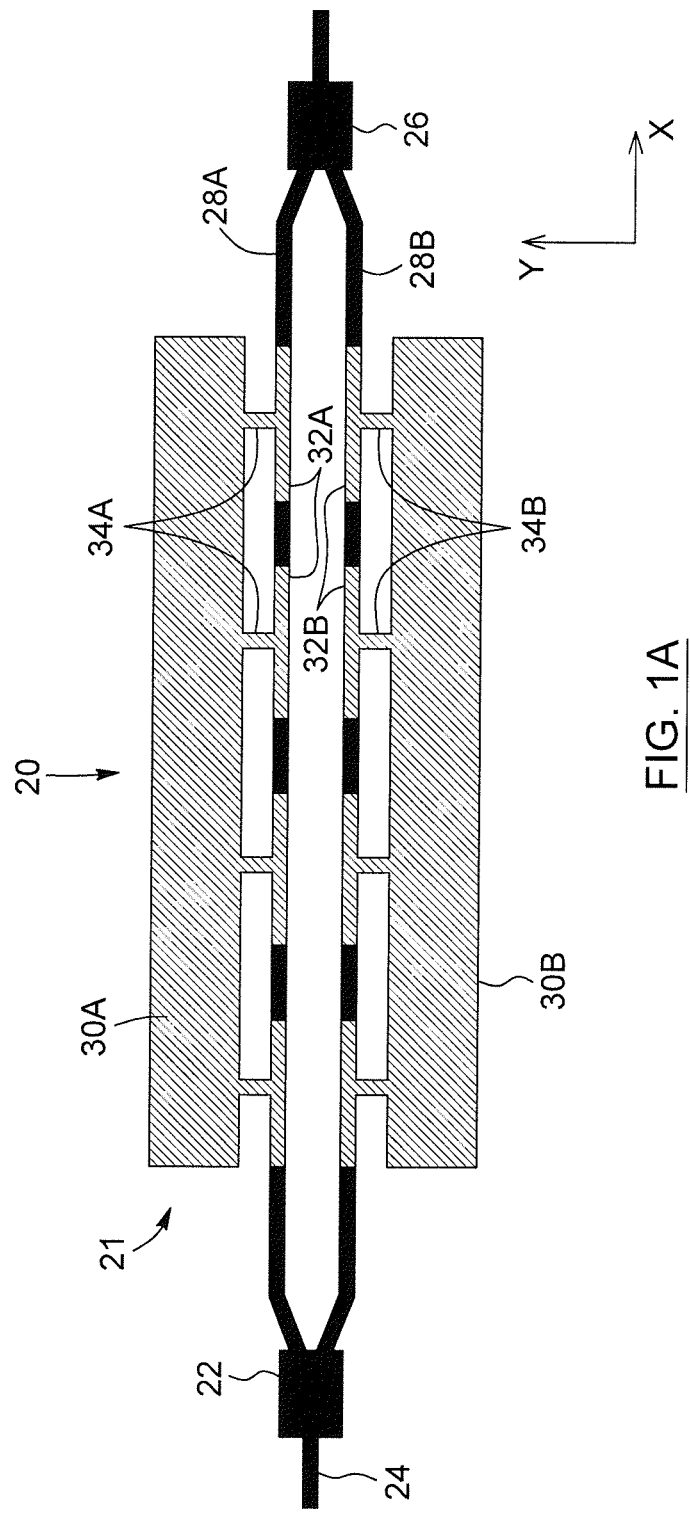
FIG. 1A (PRIOR ART) is a simplified schematic top view of the main components of a Mach-Zehnder optical modulator with a travelling wave electrode.
Figure 1B:
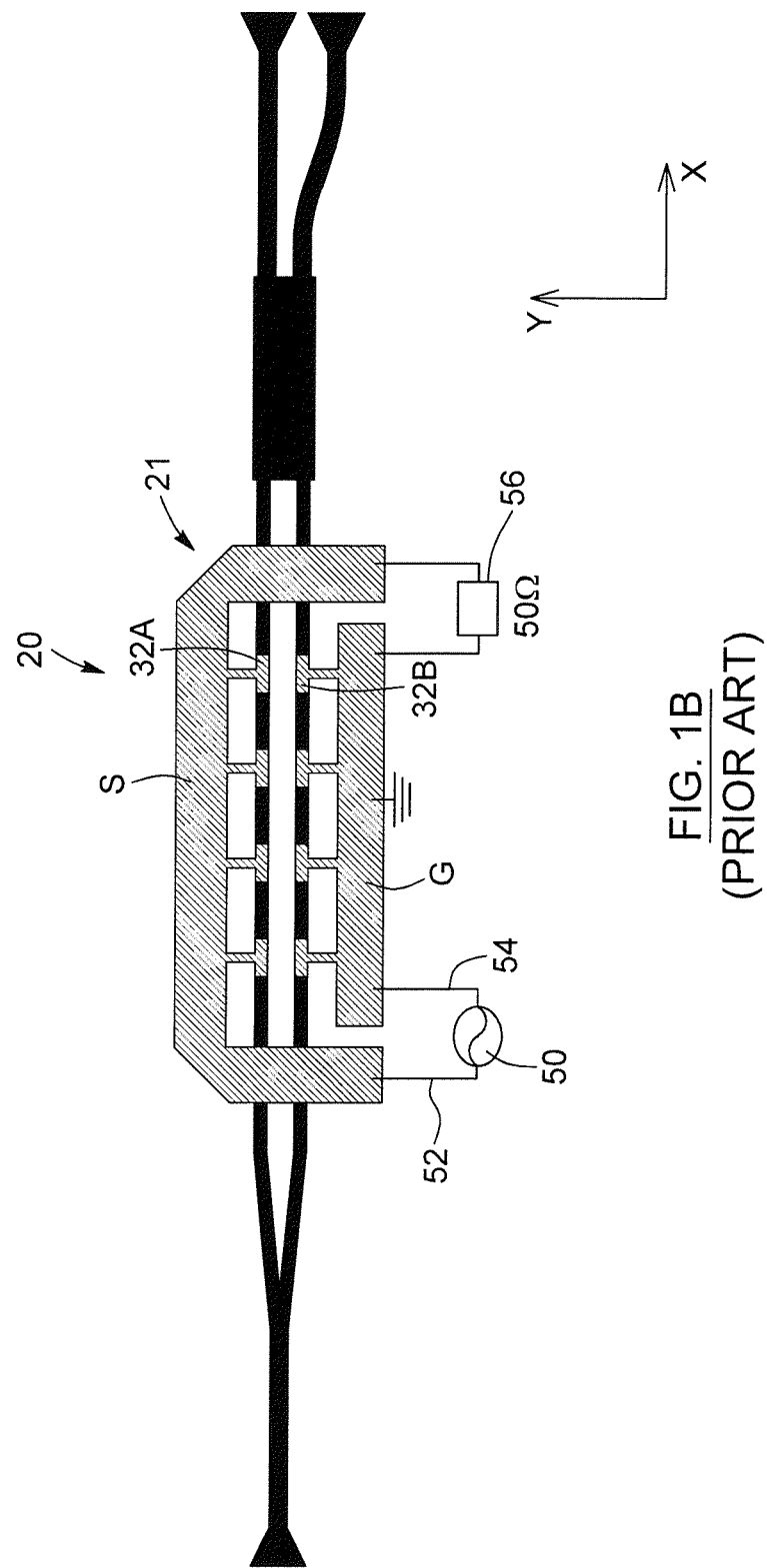
FIG. 1B (PRIOR ART) is a simplified schematic top view of a Mach-Zehnder optical modulator with a travelling wave electrode operated in single-end drive.
Figure 2:
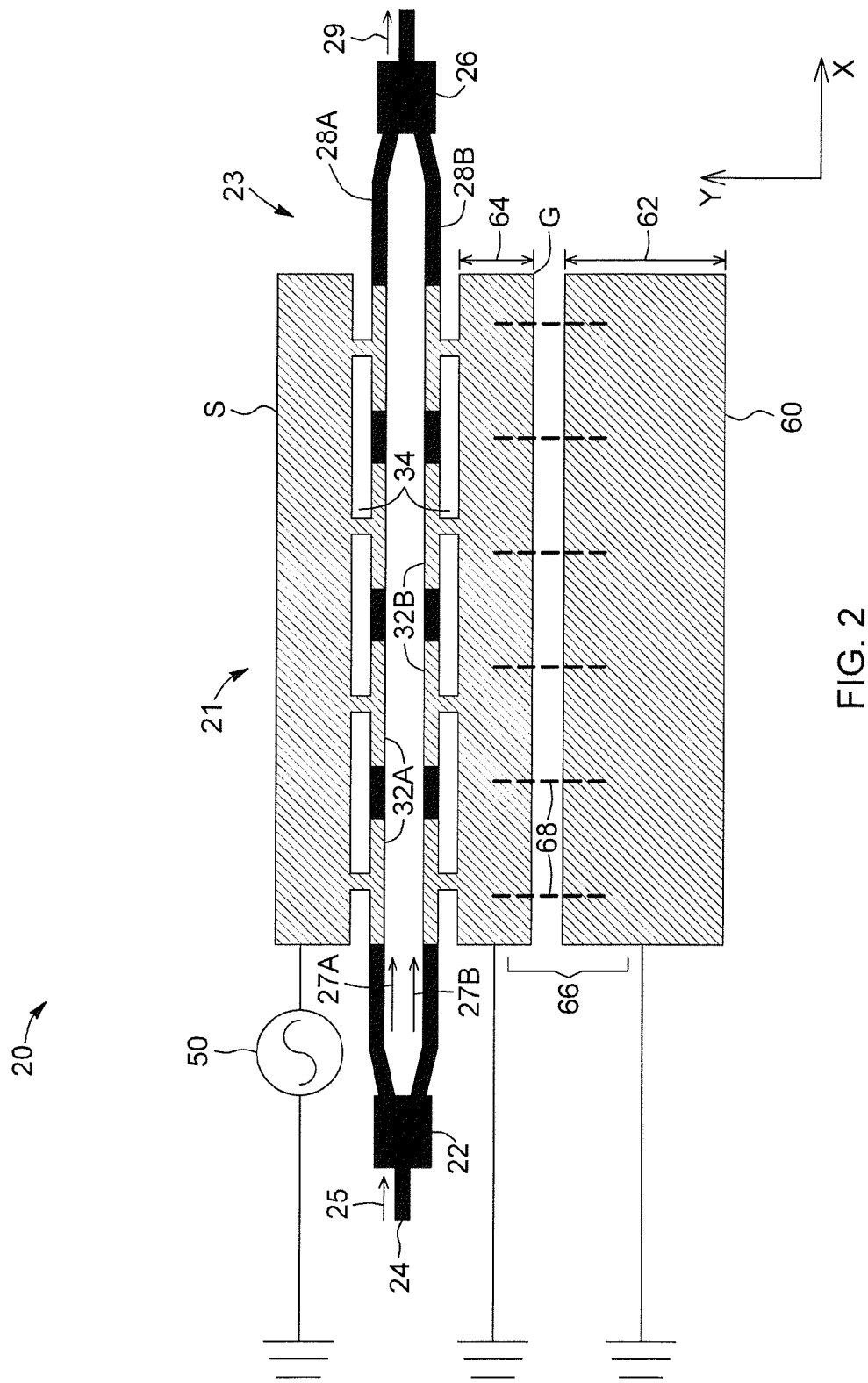
FIG. 2 is a simplified schematic top view of a Mach-Zehnder optical modulator according to one embodiment of the present invention, where the travelling-wave electrode defines a SG configuration and the ground strip conductor extends adjacent to the ground transmission line conductor.

With reference to FIG. 2, there is shown a schematic top view of a Mach-Zehnder optical modulator 20 according to one embodiment. The optical modulator includes an optical structure 23 receiving the input optical beam 25 and dividing this input optical beam 25 into two optical beam components 27A, 27B propagating in two optical waveguide branches 28A, 28B, respectively. The optical structure 23 then recombines the optical beam components 27A, 27B downstream the optical waveguide branches 28A, 28B, resulting in an output optical beam 29. In some applications dual optical output beams can be provided, such as for example shown with respect to prior art configurations in FIG. 1B. In the illustrated configuration of FIG. 2, the input optical beam is carried by an input waveguide 24, and a beam splitter 22 divides the input optical beam into the two optical beam components. The two optical beam components are recombined after propagation through the optical waveguide branches 28A, 28B by an output optical combiner 26.

In some embodiments, the optical structure 23 is defined by a semiconductor structure made of a plurality of layers selected and patterned to provide the desired light guiding characteristics. In one example, the optical structure may be defined by superposed layers of varying composition, such as the compound semiconductor indium gallium arsenide phosphide (InGaAsP) in different proportions of the constituent elements; such compositional differences resulting in differences in the index of refraction between the layers. The differences in index of refraction serve to confine the light in a given direction. In some embodiments, light confinement may be additionally achieved by etching away material in some regions creating a semiconductor-to-air or dielectric-to-air interface, again resulting in an index contrast. Etched interfaces can also be covered with the application of a different material, for example etching away a portion to create a semiconductor-to-air interface, and then replacing the material that was etched away with a dielectric, to form a semiconductor-to-dielectric interface. In other implementations, superposed doped and undoped layers or differently doped layers of a same material such as lithium niobate ($LiNbO_3$) may be provided and patterned to form ridge waveguiding constructions. As one skilled in the art will readily understand, optical structures appropriate for optical modulators may be made of a variety of materials and may be designed according to various patterns.

Typically, the beamsplitter 22 may be embodied by multi-mode interference device (MMI), a directional coupler, a Y-junction splitter, or the like. Preferably, the beamsplitter divides the input light beam such that the two resulting optical beam components have a same optical power. Furthermore, the optical beam components are coherent, that is, they have a constant relative phase.

The combiner 26 may be embodied by a multimode interference (MMI) device or the like. A MMI relies on a transition between a narrow single mode guiding structure and a wider, multi-mode guiding structure. The multimode section is judiciously designed so that various modes excited by the inputs 28A and 28B combine together in the desired fashion at the output 29.

Of course, it will be readily understood that the optical structure 23 may include additional components guiding, shaping or otherwise acting on the light travelling therein without departing from the scope of the invention.

The optical mode of light travelling in each optical waveguide branch 28A, 28B has an optical group index which is determined by the geometry and materials of the optical waveguide branches 28A, 28B. As is well known to those skilled in the art, the refractive index of an optical medium can be modified through the application of an electrical field. In a Mach-Zehnder configuration, this principle is used to adjust the relative phase of the optical beam components guided along the optical waveguide branches, thereby determining whether these optical beam components will interfere constructively or destructively once recombined.

Still referring to FIG. 2, the Mach-Zehnder modulator therefore includes a travelling wave electrode 21 modulating the relative phase of the optical beam components as they propagate along the optical waveguide branches 28A, 28B.

The travelling wave electrode 21 includes a signal transmission line conductor S, coupled to one 28A of the optical waveguide branches and conveying the input electrical signal. The signal transmission line conductor S preferably extends longitudinally parallel to the optical waveguide 28A it is coupled to, along a substantial portion of the length thereof. The travelling-wave electrode 21 further includes a ground transmission line conductor G, shown coupled to the other one of the optical waveguide branches 28B. The ground transmission line conductor G provides a return path for the input electrical signal. The ground transmission line conductor G preferably extends longitudinally parallel to the optical waveguide branch 28B it is coupled to, along a substantial portion of the length thereof.

In the illustrated embodiment, the RF signal circulating in the transmission line conductors is provided by an RF voltage source 50 having a single signal output.

The signal transmission line conductor S and ground transmission line conductor G may be embodied by any electrode structures of suitable shape and construction. In typical embodiments, a metallic layer is deposited over the semiconductor structure embodying the optical structure 23, and patterned to define the transmission line conductors S and G. The metallic layer may for example be made of gold, aluminum, copper, a multilayer stack comprising titanium, platinum and gold, or the like.

By "coupled" it is understood that the signal transmission line conductor S and the ground transmission line conductor G are disposed relative to the corresponding optical waveguide branch 28A, 28B such that the propagation of the electrical signal therealong generates a local electrical field within one or both of the optical waveguide branches 28A, 28B suitable to affect its refractive index, thereby changing the light transmission properties of the corresponding waveguide in accordance with the input electrical signal. As mentioned above, this allows a change in the relative phase of the optical beam components directly related to the electrical signal.

In the illustrated embodiment, the signal transmission line conductor S and the ground transmission line conductor G are coupled to the respectively associated optical waveguide branches 28A, 28B through a plurality of pairs of waveguide electrodes 32. The waveguide electrodes 32A, 32B of each pair are positioned adjacent the corresponding optical waveguide branch 28A or 28B. In the illustrated design, the waveguide electrodes 32A, 32B extend over the corresponding waveguide branch. Each waveguide electrode 32A, 32B is electrically connected to either the signal transmission line conductor S or to the transmission ground line G. In the illustrated embodiment, these connections are provided by bridge conductors 34, preferably embodied by a metallic segment linking the corresponding electrodes and conductors.

In the illustrated configuration, the Mach-Zehnder modulator 20 operates in "push-pull" mode, where a single voltage signal or field is used to phase modulate the optical beam components in the two waveguide branches in anti-phase. In a series push-pull configuration, each pair of waveguide electrodes 32A, 32B also act as a pair of capacitors in series and as a load on the corresponding transmission line conductors S and G.

The present invention is however not limited to periodically loaded series push-pull configuration such as shown in the previously discussed embodiment. In an alternative embodiment (not shown), the signal transmission line conductor S and ground transmission line conductor G could be embodied by elongated electrode structures having an edge extending contiguous to the corresponding waveguide branch in the X-Y plane. Such an embodiment would operate similarly to the embodiment of FIG. 2, except that the index modulation and the RF current flow are continuous along the length of the optical waveguide branches rather than being confined to periodic waveguide electrodes.

Referring back to the embodiment of FIG. 2, the Mach-Zehnder modulator 20 further includes a ground strip conductor 60 extending substantially in parallel to the ground transmission line conductor G. The ground strip conductor may be embodied by a variety of electrode structures of suitable shape and construction. Similarly to the transmission line conductors S and G, in typical embodiments the ground strip conductor 60 includes a metallic layer deposited over a suitable substrate and patterned in accordance with desired geometrical characteristics. The metallic layer may for example be made of gold, aluminum, copper, a multilayer stack comprising titanium, platinum and gold, or the like.

Preferably, as shown in the illustrated embodiment, the ground strip conductor 60 has a width 62 substantially greater than a width 64 of the ground transmission line conductor G of the travelling-wave electrode 21. As one skilled in the art will readily understand, the size of a conductor impacts its impedance, such that the larger the electrode the smaller its impedance. In some embodiments, it is desired that the impedance of the ground strip conductor be substantially smaller than the impedance of the ground transmission line conductor, so that a non-negligible portion of the current flows towards and through the ground strip conductor, supplying a substantial supplemental current return path to the grounded terminal of the RF voltage source 50. For example, in some designs a proportion of 25% of the return current flowing via the ground strip 60 at low frequencies is sufficient to reduce or eliminate signal-degrading mechanisms that have a deleterious effect on device performance at higher frequencies.

In other embodiments (not shown), the low impedance of the ground strip conductor may result from the material this ground strip conductor is made of. In other embodiments, the material, size and geometry of the ground strip electrode are designed to optimize the resulting impedance. For example, a ground strip 60 constructed from a block of copper hundreds of microns thick, wherein bottom face with the largest area is fully contacted to a grounded conductor, has a lower impedance than a narrow ground transmission line conductor G constructed from gold that is one micron thick and has a bottom face that is resting on non-conducting dielectric.

In the illustrated embodiment of FIG. 2, the ground strip conductor 60 is adjacent to the ground transmission line conductor G. By "adjacent", it is understood that both conductors extend substantially next to the other along the Y direction, and that preferably there are no further conductors between them. In other words, if one considers the XY plane of the device shown in FIG. 2, then the ground strip conductor 60 extends along and in parallel to the travelling wave electrode 21, on the side of the ground transmission line electrode G. It is to be noted that the ground strip conductor 60 may extend along a plane above or below the plane of the travelling-wave electrode (along the Z direction) without departing from the scope of the invention.

The Mach-Zehnder modulator further includes a distributed bridging structure 66 electrically connecting the ground strip conductor and the ground transmission line conductor along a substantial portion of a length thereof. In some embodiments, the distributed bridging structure may include a plurality of electrical connections 68 distributed along the length of the ground strip conductor 60. The electrical connections 68 may for example be embodied by wire bonds, made of gold or other metal; or, as another example, a flexible interconnect where conductive metal such as copper is deposited on a polymer or other flexible dielectric substrate; or, as yet another example, beads of epoxy mixed with grains of conductive material such as silver. The electrical connections 68 are preferably spaced at regular intervals along the length of the ground strip conductor. By regular intervals, it is understood that the electrical connections are preferably evenly spaced along the X direction. In other embodiments, however, the distribution of the electrical connections may follow a more complicated pattern, or no pattern at all.

In traditional optical modulator device, a narrow ground transmission line conductor G results in a poor quality ground and signal degradation. However, in the illustrated embodiment, the provision of a plurality of electrical connections 68 to a separate, relatively wide ground strip conductor 60, ideally with a much better return-path than the narrower transmission line conductor G, ensure that the ground quality is maintained. In addition, providing multiple electrical connection helps reduce the overall impedance of the bridging structure, as a single wire bond, for example, would have too high inductance to provide a current flow from the ground transmission line conductor to the ground strip conductor.

Typically, the size of the signal transmission line conductor S, and the position of the ground transmission line conductor G relative to S is of critical importance to the travelling wave electrode design. Since the ground strip conductor 60 is a separate conductor that has less of a direct influence on the electrical mode of the propagating electrical signal, there is more freedom to place the ground strip conductor 60 in alternate physical locations, thus allowing designs for which optical modulators could be placed in close proximity to each other, with little concern of cross-talk.

Referring to FIG. 3A, there is shown an end view of the configuration of FIG. 2 according to one variant of this embodiment. As illustrated, the travelling-wave electrode 21 and the ground strip conductor 60 extend on a common substrate 70. FIG. 3B shows another variant where the travelling-wave electrode 21 is provided on a first substrate 72A, and the ground strip conductor 60 is provided on a second substrate 72B physically separate from the first substrate 72A. The first and second substrates 72A and 72B are shown in this embodiment as extending over a common ground plane 74. The embodiment of FIG. 3B further provides an electrical connection between the ground strip conductor 60 and the common ground plane 74. The electrical connection may for example be embodied by a plurality of gold cylinders or vias 80, as is commonly known in the art, that provide a low impedance conductive path. In the embodiment of FIG. 3B, as the ground strip conductor 60 may be located off of the chip substrate 72A, it can be physically separate from the design of the travelling-wave electrode and enable a much narrower modulator chip design than would otherwise be possible.

As will be readily understood by one skilled in the art, in the above embodiments the narrow ground transmission line conductor G can be fabricated with sub-micron precision using standard photolithographic techniques of wafer processing, since it is part of the modulator chip. Therefore, for critical physical dimensions, such as the gap between the inner edges of the signal and ground transmission line conductors S and G, the accuracy of a monolithically integrated ground transmission line conductor is not sacrificed. However, once the position of the inner edge of the ground transmission line conductor G is established accurately, the exact route of the remaining current flow is not as critical, as long as it has low impedance. Therefore, a portion of the current return path, in the form of the ground strip conductor, can advantageously be placed in a location or on a material that is less costly than semiconductor on which the optical structure and travelling-wave electrode are fabricated.

Figure 4:
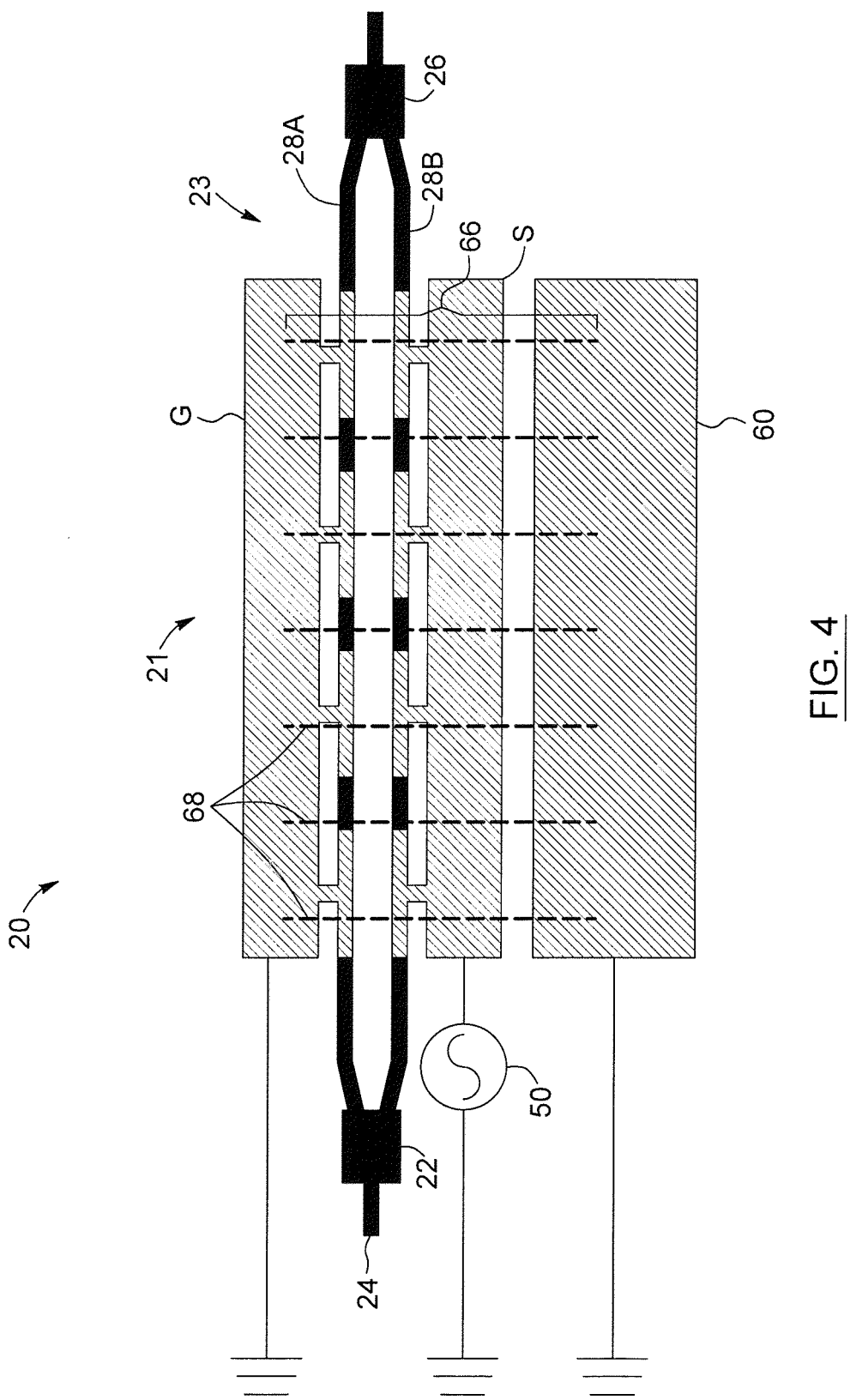
FIG. 4 is a simplified schematic top view of a Mach-Zehnder optical modulator according to one embodiment, where the travelling-wave electrode defines a SG configuration and the ground strip conductor extends adjacent to the signal transmission line conductor.

Referring now to FIG. 4, there is shown a top view of an optical modulator according to another embodiment. In this embodiment the travelling-wave electrode again defines an SG configuration, however, the ground strip conductor 60 is adjacent to the signal transmission line conductor S. As a consequence, the distributed bridging structure 66 extends from the ground strip conductor 60 over the signal transmission line conductor S to the ground transmission line conductor G. This arrangement results in an additional advantage: the signal transmission line conductor S, exposed in the design shown in FIG. 1B, is shielded from the environment by the ground strip conductor 60. Furthermore, the distributed bridging electrical structure 66 electrically connecting the ground strip conductor 60 to the ground transmission line conductor G assist in shielding the signal conductor S from the environment above the plane of the device.

Referring to FIG. 5A, there is shown an end view of the configuration of FIG. 4 according to one variant of this embodiment. As with FIG. 3A discussed above, the travelling-wave electrode 21 and the ground strip conductor 60 extend on a common substrate 70. The distributed bridging structure connecting the ground strip conductor 60 and the ground transmission line conductor G is schematically shown as following a path above the travelling-wave electrode to illustrate that it is in practice deposited over and across the signal transmission line electrode S. FIG. 5B shows another variant where the travelling-wave electrode 21 is provided on a first substrate 72A, and the ground strip conductor 60 is provided on a second substrate 72B physically separate from the first substrate 72A. Again, the first and second substrates 72A and 72B are shown in this embodiment as extending over a common ground plane 74. An electrical connection between the ground strip conductor 60 and the common ground plane 74 may be provided. The electrical connection may for example be embodied by a plurality of gold cylinders or vias 80, as is commonly known in the art, that provide a low impedance conductive path. This configuration can provide a substantial reduction in modulator width, but without the disadvantage of signal degradation due to a narrow grounded transmission line conductor. It will also be noted that this configurations provides an asymmetrically loaded travelling-wave electrode such as described in United States co-pending application Ser. No. 14/075,854, filed on Nov. 8, 2013.

Figure 6:
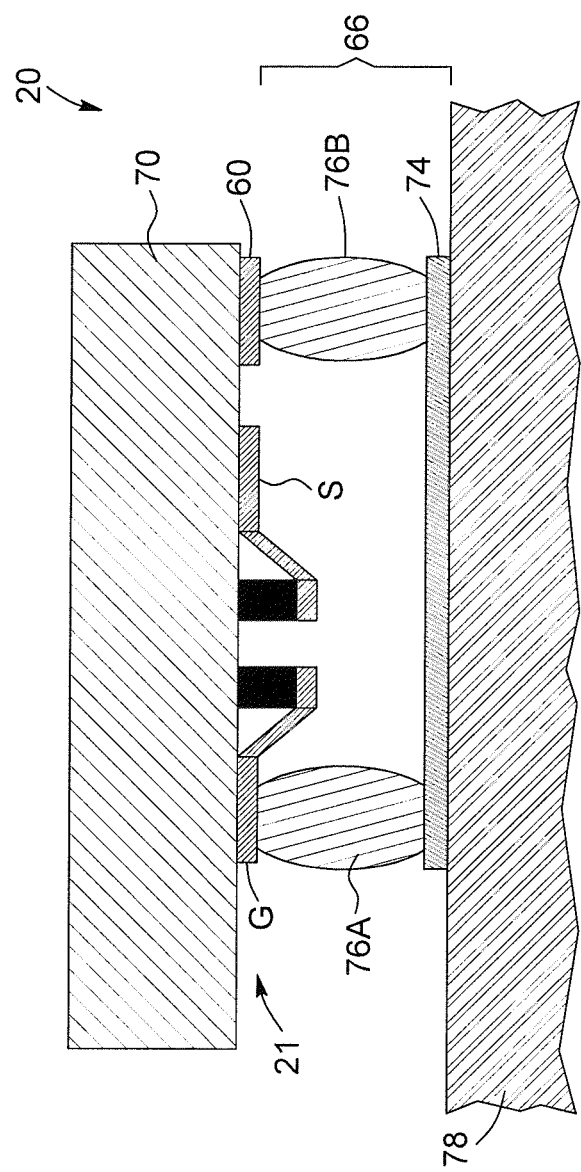
FIG. 6 is a simplified schematic end view of a Mach-Zehnder optical modulator according to one embodiment, where the travelling-wave electrode defines a SG flip-chip bonded configuration.

Referring to FIG. 6, there is shown another embodiment where the illustrated configuration is a flip chip bonded version of the embodiment shown in FIGS. 4 and 5A. In this embodiment, the travelling-wave electrode 21 and the ground strip conductor 60 extend on a common substrate 70, which is "flipped" so that the travelling wave electrode extends upside-down. A common ground plane 74 is vertically aligned with the travelling wave electrode 21 and ground strip conductor 60, preferably mounted on a support structure such as a ceramic carrier 78. The distributed bridging structure 66 is embodied by a first set of conductive bumps 76A connecting the ground transmission line conductor G and the common ground plane 74, and a second set of conductive bumps 76B connecting the common ground plane 74 to the ground strip conductor 60. The conductive bumps may be made from, for example, gold alone or a eutectic alloy of tin, copper and silver or other metals. In this manner, the common ground plane acts as a part of the bridging structure 66, enabling a more compact device design.

Figure 7:
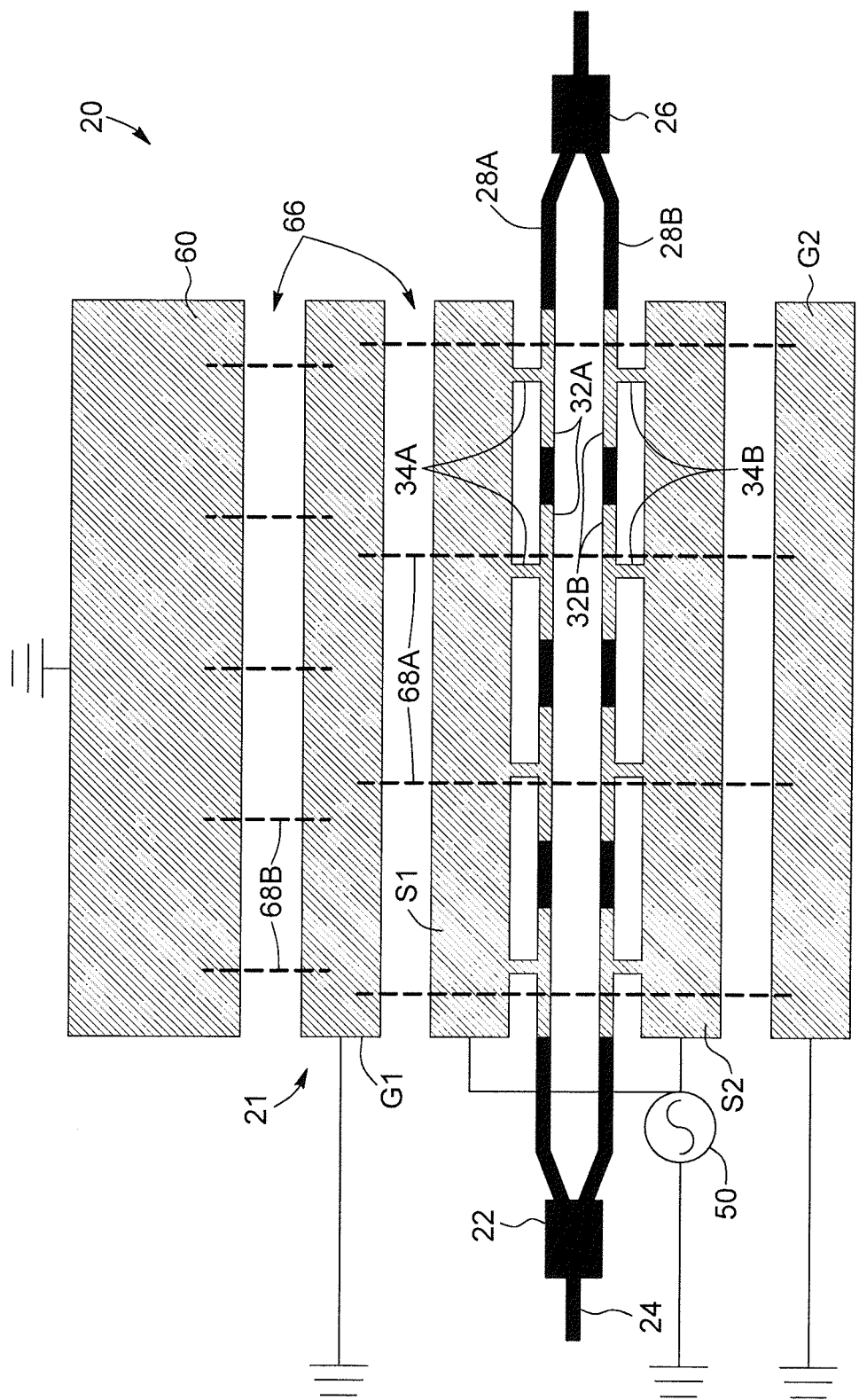
FIG. 7 is a simplified schematic top view of a Mach-Zehnder optical modulator according to one embodiment, where the travelling-wave electrode defines a GSSG configuration.

Referring now to FIG. 7, there is shown yet another embodiment of a Mach-Zehnder optical modulator 20, where the travelling-wave electrode 21 defines a GSSG configuration. The travelling wave electrode 21 here includes a pair of signal transmission line conductors S1 and S2, each coupled to a respective one of the optical waveguide branches 28A and 28B. The signal transmission line conductors convey the input electrical signal. In the illustrated embodiment, the signal transmission line conductors S1 and S2 are connected to the differential outputs of an RF voltage source 50. The travelling wave electrode 21 further includes a pair of ground transmission line conductors G1 and G2 each providing a return path for the input electrical signal. The signal transmission line conductors S1 and S2 are positioned between the ground transmission line conductors G1 and G2, hence providing the GSSG configuration. As with the previous embodiments, the travelling-wave electrode 21 includes a plurality of pairs of waveguide electrodes 32A, 32B. The waveguide electrodes 32A, 32B of each pair are positioned adjacent a corresponding one of the optical waveguide branches 28A,28B and are electrically connected to the corresponding signal transmission line conductor. The signal transmission line conductors S1 and S2 may however be coupled to the waveguiding branches 28A and 28B in a different manner without departing from the scope of the invention.

A ground strip conductor 60 extends substantially in parallel to the ground transmission line conductors G1 and G2, and a distributed bridging structure 66 electrically connects the ground strip conductor 60 to one, or both, of the ground transmission line conductors G1 and G2 along a substantial portion of a length thereof.

Preferably, the ground strip conductor provides a better return-to-ground path for the input electrical signal than the ground transmission line conductors G1 and G2. This may for example be achieved by a ground strip conductor 60 having a width substantially greater than the width of the ground transmission line conductors G1 and G2 of the travelling-wave electrode, by selecting an appropriate material for the ground strip conductor 60, or both.

The distributed bridging structure 66 includes a plurality of electrical connections distributed along the length of the ground strip conductor 60, for example wire bonds, made of gold or other appropriate metal. The wire bonds or other electrical connections are preferably spaced at regular intervals along the length of the ground strip conductor 60. As can be seen from FIG. 7, in one embodiment the bridging structure 66 includes a first set of wire bonds 68A connecting the ground transmission line conductors G1 and G2 together, and a second set of wire bonds 68B connecting the ground strip conductor 60 and one of the ground transmission line conductors G1. It will be noted, as illustrated schematically in FIG. 7, that the wire bonds of the first set 68A need not be aligned with the wire bonds of the second set 68B.

FIGS. 8A and 8B show end views of two different variants of the modulator of FIG. 7. In FIG. 8A, the travelling-wave electrode 21 and the ground strip conductor 60 extend on a common substrate 70. In FIG. 8B, the travelling-wave electrode 21 is provided on a first substrate 72A, and the ground strip conductor 60 is provided on a second substrate 72B physically separate from the first substrate 72A. The first and second substrates 72A and 72B extend over a common ground plane 74. The embodiment of FIG. 8B further provides an electrical connection between the ground strip conductor 60 and the common ground plane 74. The electrical connection may for example be embodied by a plurality of gold cylinders or vias 80, as is commonly known in the art, that provide a low impedance conductive path. Advantageously, in the configuration of FIG. 8B, both of the signal transmission line conductors S1 and S2 are shielded from the external environment on all sides by the two ground transmission line conductors G1 and G2, bridging structure 66, the ground strip conductor 60 and the common ground plane 74.

Figure 9A:
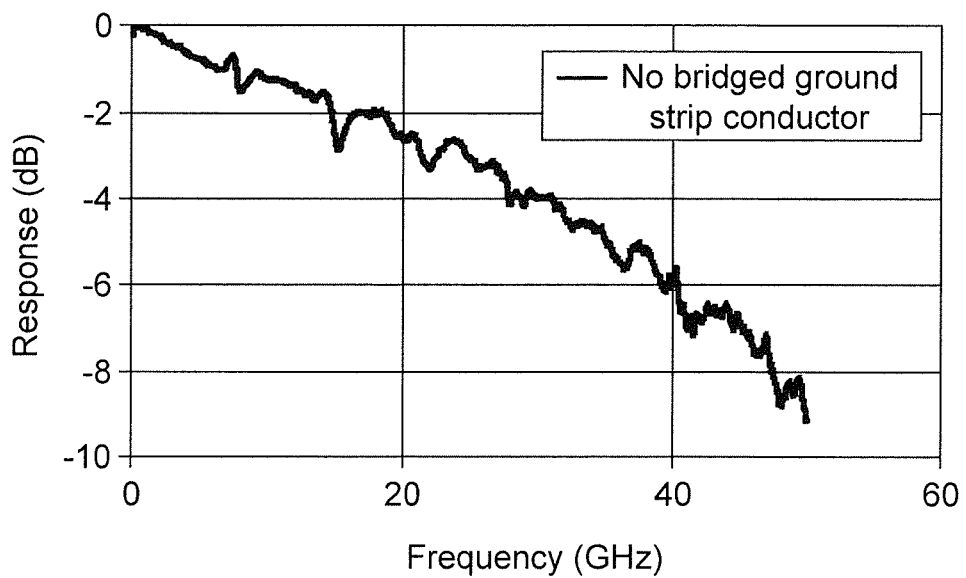
FIGS. 9A and 9B are graphs showing the experimentally measured frequency response of the GSSG embodiment of the device of FIG. 8B, without (FIG. 9A) and with (FIG. 9B) the ground strip conductor and distributed bridging structure, respectively.
Figure 9B:
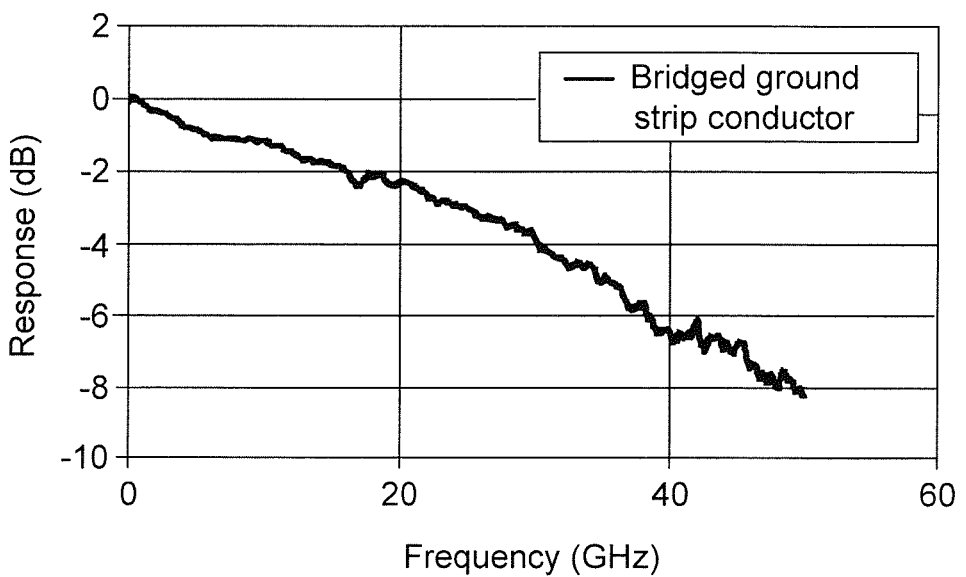

FIGS. 9A and 9B show the detected optical response of an optical modulator made according to the design of FIG. 8B, without and with the ground conductor strip and distributed bridging structure, respectively. The disadvantageous impact of using narrow ground transmission line conductors is evident in the multiple sharp resonant peaks and valleys in FIG. 9A. With a ground strip conductor on a separate substrate such as shown in FIG. 8B, the resonances disappear and a preferred smooth response curve is achieved, as shown in FIG. 9B.

Figure 10:
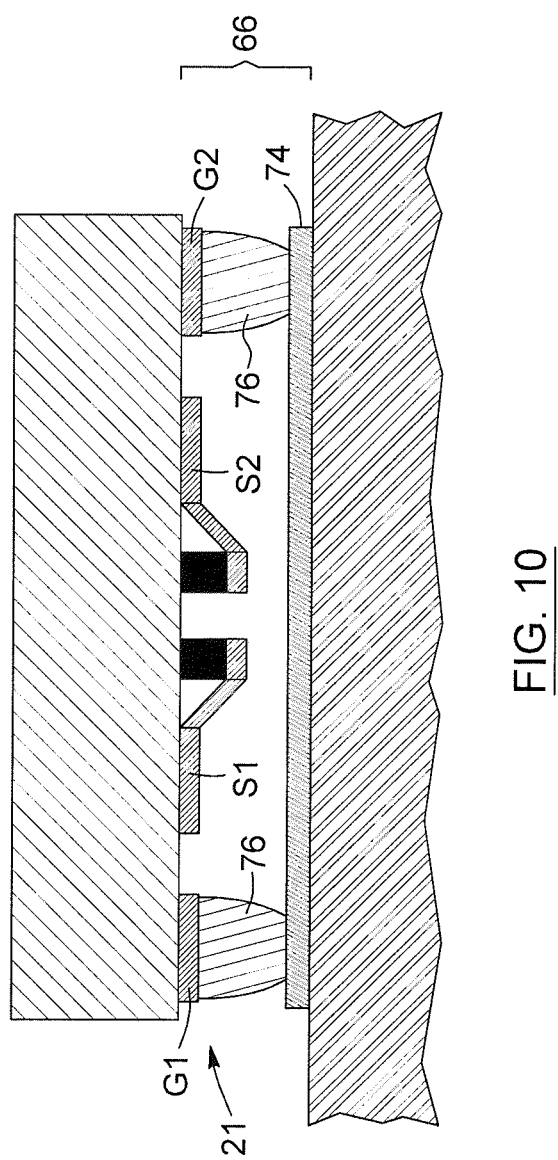
FIG. 10 is an end view of a flip chip bonded version of the GSSG configuration shown in FIG. 7.

Referring to FIG. 10, there is shown a flip-chip embodiment of a GSSG configuration according to an embodiment. In this case the ground strip conductor defines a common ground plane 74 vertically aligned with the travelling wave electrode 21. The distributed bridging structure 66 includes a plurality of conductive bumps 76 connecting the ground transmission line conductors G1 and G2 to the common ground plane 74.

Although the embodiments described herein relate to SG and GSSG configurations, it will be readily understood that in other variants the invention may be applied to different configurations, such as for example GSGSG or the like.

Of course, numerous modifications could be made to the embodiments described above without departing from the scope of the invention as defined in the appended claims.

The invention claimed is:

1. A Mach-Zehnder optical modulator for modulating an input optical beam according to an electrical modulation signal, the Mach-Zehnder modulator comprising an optical structure dividing the input optical beam into two optical beam components propagating in two optical waveguides branches, respectively, and recombining said optical beam components downstream the optical waveguides branches, the Mach-Zehnder modulator further comprising:

a travelling wave electrode modulating a relative phase of the optical beam components, said travelling wave electrode comprising a signal transmission line conductor coupled to one of the optical waveguide branches and conveying the input electrical signal, and a ground transmission line conductor providing a return path for the input electrical signal;

a ground strip conductor extending substantially in parallel to the ground transmission line conductor; and a distributed bridging structure electrically connecting the ground strip conductor and the ground transmission line conductor along a substantial portion of a length thereof.

2. The Mach-Zehnder optical modulator according to claim 1, wherein the ground strip conductor has a width substantially greater than a width of the ground transmission line conductor of the travelling-wave electrode.

3. The Mach-Zehnder optical modulator according to claim 1, wherein the ground strip conductor is adjacent to the ground transmission line conductor.

4. The Mach-Zehnder optical modulator according to claim 1, wherein the ground strip conductor is adjacent to the signal transmission line conductor, the distributed bridging structure extending from the ground strip conductor over the signal transmission line conductor to the ground transmission line conductor.

5. The Mach-Zehnder optical modulator according to claim 1, wherein the distributed bridging structure comprises a plurality of electrical connections distributed along the length of the ground strip conductor.

6. The Mach-Zehnder optical modulator according to claim 5, wherein the electrical connections are spaced at regular intervals along the length of the ground strip conductor.

7. The Mach-Zehnder optical modulator according to claim 6, wherein the electrical connections are wire bonds.

8. The Mach-Zehnder optical modulator according to claim 1, wherein the travelling-wave electrode and the ground strip conductor extend on a common substrate.

9. The Mach-Zehnder optical modulator according to claim 1, wherein the travelling-wave electrode is provided on a first substrate, and the ground strip conductor is provided on a second substrate physically separate from the first substrate.

10. The Mach-Zehnder optical modulator according to claim 9, further comprising a common ground plane, the first and second substrates extending over said common ground plane.

11. The Mach-Zehnder optical modulator according to claim 1, further comprising a common ground plane vertically aligned with the travelling wave electrode and ground strip conductor, the distributed bridging structure comprising a first set of conductive bumps connecting the ground transmission line conductor and the common ground plane, and a second set of conductive bumps connecting the common ground plane to the ground strip conductor.

12. The Mach-Zehnder optical modulator according to claim 1, further comprising a plurality of pairs of waveguide electrodes, the waveguide electrodes of each pair being positioned adjacent a corresponding one of the optical waveguide branches and being electrically connected to the signal transmission line conductor and to the ground transmission line conductor, respectively.

13. A Mach-Zehnder optical modulator for modulating an input optical beam according to an electrical modulation signal, the Mach-Zehnder modulator comprising an optical structure dividing the input optical beam into two optical beam components propagating in two optical waveguides branches, respectively, and recombining said optical beam components downstream the optical waveguides branches, the Mach-Zehnder modulator further comprising:
  a travelling wave electrode modulating a relative phase of the optical beam components, said travelling wave electrode comprising a pair of signal transmission line conductors each coupled to a respective one of the optical waveguide branches and conveying the input electrical signal, and a pair of ground transmission line conductors each providing a return path for the input electrical signal, the pair of signal transmission line conductors being positioned between the ground transmission line conductors;
  a ground strip conductor extending substantially in parallel to the ground transmission line conductors; and
  a distributed bridging structure electrically connecting the ground strip conductor and at least one of the ground transmission line conductors along a substantial portion of a length thereof.

14. The Mach-Zehnder optical modulator according to claim 13, wherein the ground strip conductor has a width substantially greater than a width of the ground transmission line conductors of the travelling-wave electrode.

15. The Mach-Zehnder optical modulator according to claim 13, wherein the distributed bridging structure comprises a plurality of electrical connections distributed along the length of the ground strip conductor.

16. The Mach-Zehnder optical modulator according to claim 15, wherein the electrical connections are spaced at regular intervals along the length of the ground strip conductor.

17. The Mach-Zehnder optical modulator according to claim 15, wherein the electrical connections are wire bonds.

18. The Mach-Zehnder modulator according to claim 13, wherein the distributed bridging structure comprises a first set of wire bonds connecting the ground transmission line conductors of said pair together, and a second set of wire bonds connecting ground strip conductor and one of the ground transmission line conductors of said pair.

19. The Mach-Zehnder optical modulator according to claim 13, wherein the travelling-wave electrode and the ground strip conductor extend on a common substrate.

20. The Mach-Zehnder optical modulator according to claim 13, wherein the travelling-wave electrode is provided on a first substrate, and the ground strip conductor is provided on a second substrate physically separate from the first substrate.

21. The Mach-Zehnder optical modulator according to claim 20, further comprising a common ground plane, the first and second substrates extending over said common ground plane.

22. The Mach-Zehnder optical modulator according to claim 13, wherein the ground strip conductor defines a common ground plane vertically aligned with the travelling wave electrode, the distributed bridging structure comprising a plurality of conductive bumps connecting the ground transmission line conductors of said pair to the common ground plane.

23. The Mach-Zehnder optical modulator according to claim 13, further comprising a plurality of pairs of waveguide electrodes, the waveguide electrodes of each pair being positioned adjacent a corresponding one of the optical waveguide branches and being electrically connected to the corresponding signal transmission line conductor.

* * * * *